Jan. 27, 1925.
G. W. DRAKE ET AL
1,524,294
MULTIPLE DISK CLUTCH
Filed Aug. 20, 1921 2 Sheets-Sheet 1
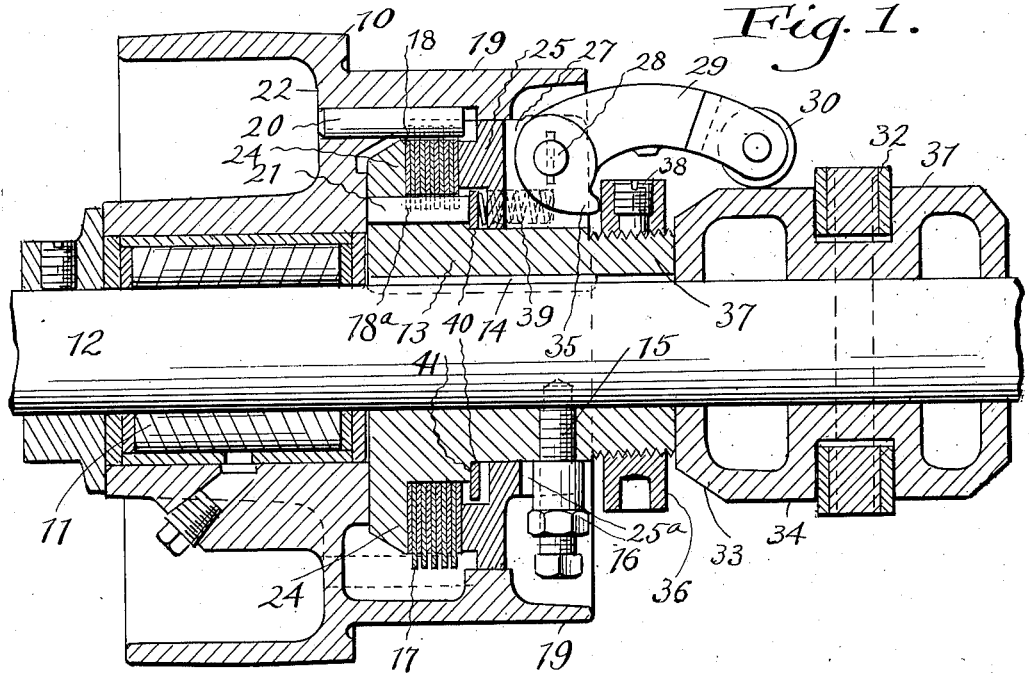
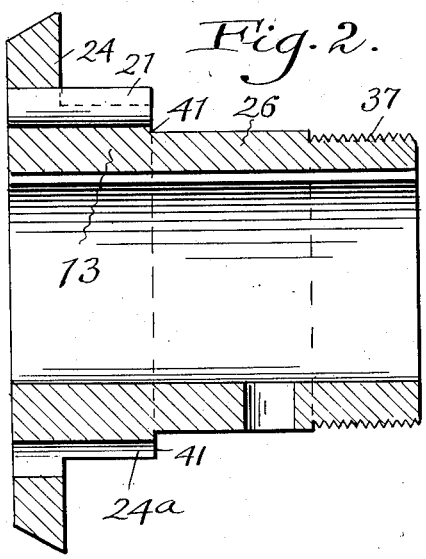
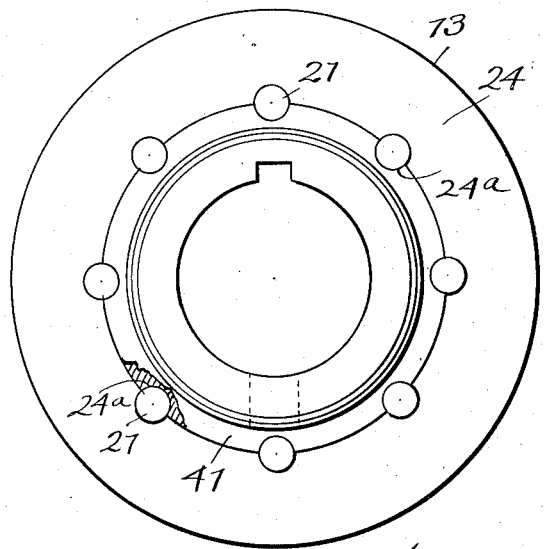
Inventors.
George W. Drake and
Leslie R. Tufts
by Thurston Kwon & Hudson
attys.

Jan. 27, 1925.
G. W. DRAKE ET AL
1,524,294
MULTIPLE DISK CLUTCH
Filed Aug. 20, 1921
2 Sheets-Sheet 2
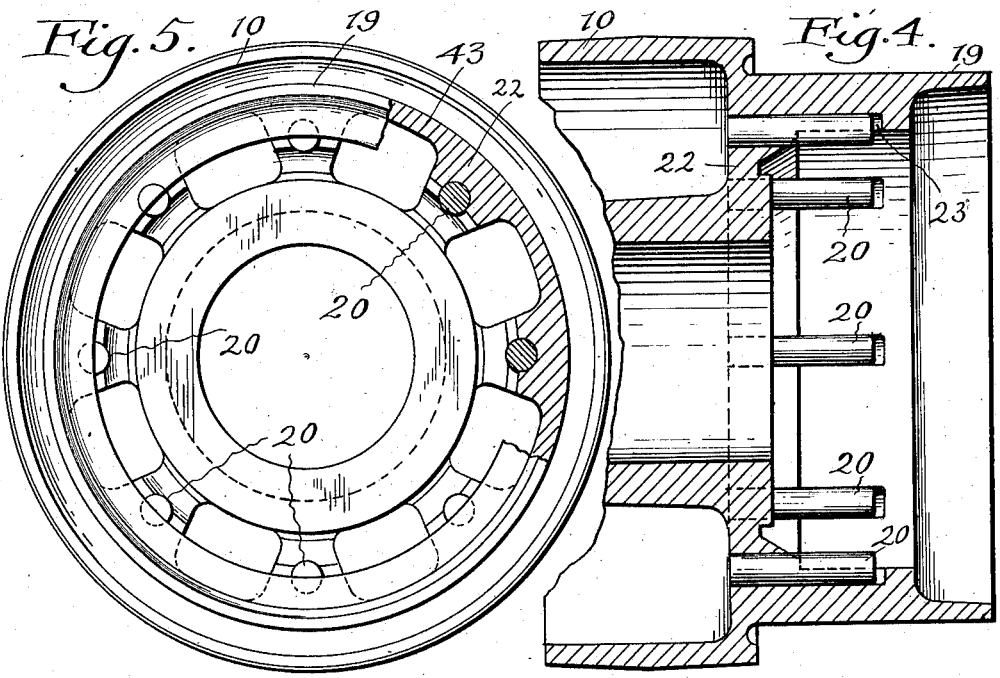
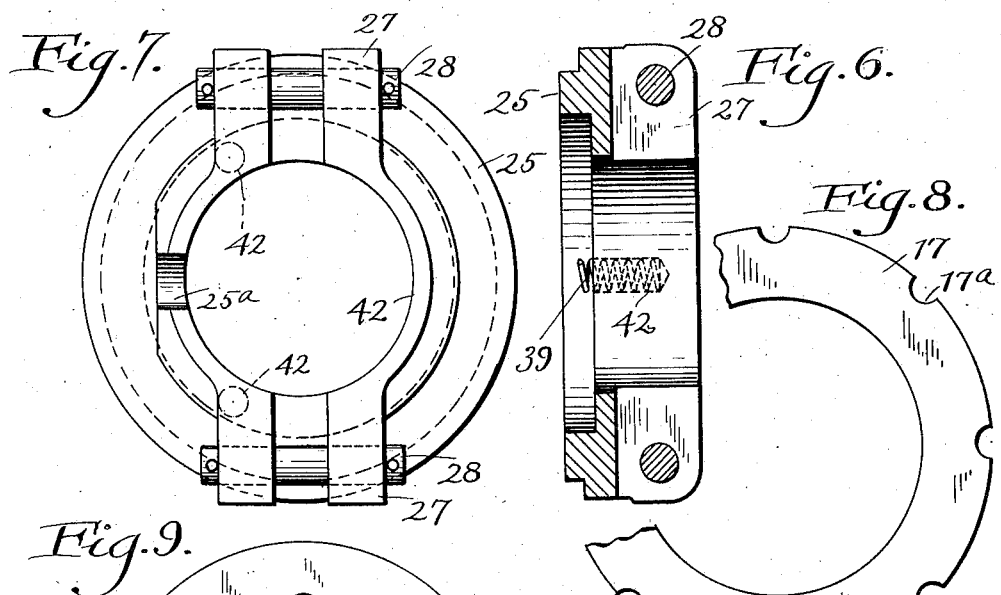
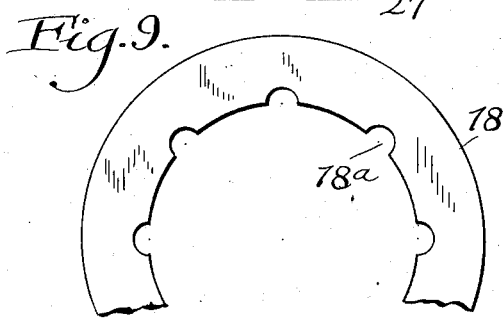

Patented Jan. 27, 1925.

1,524,294

UNITED STATES PATENT OFFICE.

GEORGE W. DRAKE, OF CLEVELAND HEIGHTS, AND LESLIE R. TUFTS, OF EAST CLEVELAND, OHIO, ASSIGNORS TO THE WARNER & SWASEY COMPANY, OF CLEVELAND, OHIO, A CORPORATION OF OHIO.

MULTIPLE-DISK CLUTCH.

Application filed August 20, 1921. Serial No. 493,798.

*To all whom it may concern:*

Be it known that we, GEORGE W. DRAKE and LESLIE R. TUFTS, citizens of the United States, and residents, respectively, of Cleveland Heights, in the county of Cuyahoga and State of Ohio, and East Cleveland, in the county of Cuyahoga and State of Ohio, have invented a certain new and useful Improvement in Multiple-Disk Clutches, of which the following is a full, clear, and exact description.

This invention relates to an improved multiple disk friction clutch, and has for its chief object to provide certain features which improve the construction and operation of clutches of this type. More specifically considered, the invention aims to provide a clutch which has features of simplicity, durability and cheapness of construction, which is powerful yet easily operated and which is so constructed that the disks have an easy smooth engagement when the clutch is thrown in and are quickly and positively released when it is thrown out.

The invention resides particularly in the arrangement or manner of supporting driving pins which engage the disks carried by the driving and driven members respectively, and also to a new combination of parts including an adjustable nut by which the clutch can be readily adjusted.

The invention may be further briefly summarized as consisting in certain novel details of construction and combinations and arrangements of parts which will be described in the specification and set forth in the appended claims.

In the accompanying sheets of drawings illustrating an embodiment of the invention which operates very effectively, Fig. 1 is a longitudinal sectional view through the clutch the plane of the section of the lower half being slightly to one side of the plane of the section of the upper half; Fig. 2 is a detached longitudinal sectional view of the driven member showing one of the driving pins in place; Fig. 3 is an end view of the same; Fig. 4 is a view similar to Fig. 2 showing the driving member. Fig. 5, is an end view of the same looking toward the right of Fig. 4, portions being broken away; Fig. 6 is a sectional view of the finger holder; Fig. 7 is a face view of the same, and Figs. 8 and 9 are fragmentary views illustrating respectively one of the disks carried by the driving member and one of the disks carried by the driven member.

Referring now to the drawings, 10 represents the driving member in the form of a pulley which is supported by standard roller bearings 11 on shaft 12 either to turn loosely on the shaft when the clutch is thrown out, or to rotate the shaft when the clutch is thrown in.

The driven member which is keyed to the shaft is illustrated at 13, this member being connected to the shaft by a key 14 and in this instance being held from endwise movement on the shaft by a set screw 15 having a lock nut 16. Power is transmitted from the pulley 10 to the driven member 13, and therefore to the shaft 12 by a number of alternately arranged driving and driven friction disks 17 and 18, which are carried by the pulley 10 and by the driven member 13 respectively.

The pulley 10 has an annular laterally projecting flange 19 which surrounds the friction disks as well as the major portion of the driven member 13, as is apparent from Fig. 1.

One important feature of the invention, broadly considered, resides in the means by which driving engagement is formed between the pulley 10 and the disks carried by it, and also between the driven member 13 and the disks carried by it. In this instance a series of equally spaced cylindrical pins 20 carried by the pulley engage in semi-circular notches 17$^a$ at the outer edges of the disks 17 carried by the pulley, which disks are termed the driving disks, and a series of similar cylindrical pins 21 carried by the driven member 13 engage in semi-circular notches 18$^a$ at the inner peripheries of the driven disks 18 carried by the driven member. It is an important feature of this invention that the two series of pins 20, 21 do not overhang, i. e., are not supported at one end and unsupported for the remainder of their length, but the pins of both series are supported for their full length. By reference to Figs. 4 and 5 it will be seen that the pins 20 are driven in and are entirely surrounded for nearly half their length in the outwardly extending wall 22 of the pulley 10, and that for the remainder of their length the pins lie in semi-circular grooves 23 in the inner wall or periphery of the laterally projecting flange 19 of the pulley. Likewise, by reference to Figs. 2 and 3 it will be seen that the series of inner pins 21 are driven in and therefore wholly surrounded and supported for a portion of their length in an outwardly extending portion 24 of the driven member 13, and that for the remainder of their length these pins lie in semicylindrical grooves 24ᵃ located to the right of the outstanding portion 24 as the driven member is viewed in Fig. 2. In consequence both sets of pins are wholly supported for the full length which eliminates possibility of shearing and gives them no opportunity to work back and forth and enlarge or wear the notches of the driving and driven disks.

Another important feature of the invention lies in what we believe to be a novel relationship of parts employed in conjunction with the two sets of disks and the driving and driven members above referred to.

It will be observed particularly by reference to Fig. 1 that the disks are designed to be clamped between the outwardly extending flange 24 of the driven member 13 and a ring or so-called finger holder 25 which is surrounded by the laterally projecting flange 19 of the driving member 10 and is designed to have a predetermined axial movement on a reduced portion 26 of the driven member 13. The disk clamping ring 25 is provided with a slot or notch 25ᵃ which receives the lock nut 16 and by the latter is held from turning relative to or on the portion 26 of the driven member 13. Likewise the ring is provided at diametrically opposite points (see Fig. 7) with a pair of lugs 27, between which are pivoted by pins 28, a pair of fingers 29, which project outwardly endwise of the clutch from the space between the flange 19 of the driving member and the cylindrical body portion of the driven member 13. At their outer ends these fingers carry rollers 30 designed to be engaged by a sleeve or so-called wedge 31, adapted to be shifted axially of the shaft 12 by a fork 32 which can be moved manually by any suitable means. This sleeve at its end adjacent the clutch is provided with a beveled face 33 up which the rollers 30 roll when the clutch is thrown in, and outwardly of the bevel face 33 there is a cylindrical face 34 onto which the rollers roll during the final inward movement of the sleeve 31. When the rollers are on this cylindrical face 34 the clutch is engaged.

The fingers 29 are provided with relatively short arms or heels 35 which lie inwardly or toward the shaft from the pivoting pins 28, the free ends of these short arms 35 engaging the inner face of a nut 36 which is screwed onto the outer threaded end 37 of the driven member. When this nut is once adjusted to proper position it is secured in that position by a set screw 38, as shown in Fig. 1.

To apply or engage the clutch, the sleeve is shifted to the left as the clutch is viewed in Fig. 1, causing the rollers to ride up on the beveled face 33 of the sleeve 31 and then onto the cylindrical face 34. As they ride up on the beveled face, the outer ends of the fingers are moved outwardly forcing the short arms 35 against the nut 36, but as the nut is stationary on the driven member, the effect of this is to move the disk clamping ring 25 inward or toward the left as viewed in Fig. 1, producing the necessary clamping pressure between the disksc to cause the driving member to drive the driven member 13, and therefore the shaft 12, without slippage between the disks. This engagement is easy and relatively smooth instead of harsh as might be the case in clutches of this type.

When the sleeve 31 is moved toward the right as the same is viewed in Fig. 1, the clutch is quickly and positively released or thrown out, and this is accomplished by a plurality of springs 39, three such springs being preferably employed, which springs are axially disposed about the portion 26 of the driven member, and at their inner ends engage a ring 40 bearing against a shoulder 41 adjacent the outer ends of the pins 21. Likewise these springs are seated in sockets 42 of the ring 25 which sockets are indicated by dotted lines in Fig. 7 and one shown by dotted lines in Fig. 1. It will be obvious that when the clutch is thrown in, these springs are compressed, and that the clutch is instantly and positively released by these springs when the sleeve 31 is moved to clutch releasing position, so that the outer ends of the fingers and the rollers 30 may move inward toward the shaft.

It will be apparent that the clutch can be adjusted by turning simply one member, namely, the nut 36, whereas in most prior multiple disk clutches of which we are aware, the adjusting of several members is necessary to adjust the clutch.

Finally it may be stated that the driving member is provided between the pins 20 with pockets 43 which are used primarily to lighten the driving member though these pockets may be utilized to carry lubricant adapted to be supplied to the disks. However, it is a feature of this clutch that no lubricant is required for the smooth operation of the clutch. Another feature is that no friction facings are required for the disks as in many multiple disk clutches. Furthermore, it will be seen from the above description that the construction of the clutch is not complicated, but on the other hand, is simple, and that it can be built inexpensively, though the construction is such that a powerful clutch is provided. It is to be noted that the major portion of the clutch mechanism is enclosed within the overhanging portion of a part of the pulley 10 which admits of a considerable shortening of the device in an axial direction. Further, it is to be noted that the disk clamping ring 25 has a bearing both on the reduced portion of the inner clutch member and in the overhanging portion of the outer clutch member. It will therefore act as a support or thrust resisting member for the overhanging portion of the pulley, this being of considerable advantage in a stepped pulley as herein shown, to resist the thrust created by the pull of the belt on the smaller step of the pulley. Additionally it forms a closed chamber for the disks, not only excluding the dirt and dust therefrom, but permitting a supply of lubricant to the closed chamber if the same should be found desirable.

We do not desire to be confined to the exact details shown and described, but aim in our claims to cover all modifications which do not involve a departure from the spirit and scope of the invention as defined in the appended claims.

Having described our invention, we claim:

1. In a multiple disk clutch, driving and driven members each carrying disks alternating with disks of the other member, one of said members having a radial portion and an axial portion which is integral therewith and overhangs the other member, the radial portion having openings extending entirely therethrough and the axial portion having grooves in its inner periphery extending toward but short of the end of the axial portion, and pins fixed in said openings and seated in said grooves and engaging the peripheral portions of one of the sets of disks.

2. In a multiple disk clutch, driving and driven members each carrying disks alternating with disks of the other member, one of said members having an outer axially extending portion which overhangs the other member, said other member having at its inner end an abutment, a clamping ring slidable upon a portion of said other member outwardly of said abutment and also located within said overhanging portion of the first named member and having a bearing therein, and means for actuating said clamping ring.

3. In a multiple disk clutch, driving and driven members each carrying disks alternating with disks of the other member, one of said members having an outer axially extending portion which overhangs the other member, said other member having at its inner end an abutment, a clamping ring slidable upon a portion of said other member outwardly of said abutment and also located within said overhanging portion of the first named member and extending to and engaging the same, and means for actuating said clamping ring including fingers pivotally connected thereto, and means for shifting said fingers to actuate said ring.

4. In a multiple disk clutch, driving and driven members each carrying disks alternating with disks of the other member, one of said members having an outer axially extending portion which overhangs the other member, said other member having at its inner end an abutment, a clamping ring slidable upon a portion of said other member outwardly of said abutment and also located within said overhanging portion of the first named member and having a bearing therein, and means for actuating said clamping ring including fingers pivotally connected thereto, axially movable means for spreading the outer ends of the fingers, and a relatively fixed abutment against which inner portions of the fingers engage.

5. In a multiple disk clutch, driving and driven members each carrying disks alternating with disks of the other members, one of said members having an outer axially extending portion which overhangs the other member, said other member having an abutment at one side of the disks and on the other side of the disks having an extension, a clamping ring slidable on a portion of said extension within the overhanging portion of the first name member and having a bearing therein, fingers pivotally connected to the clamping ring, axially movable means for spreading the outer ends of the fingers, and an abutment adjustably seated on said outer part of said extension and engaged by the inner portions of the fingers.

6. In a multiple disk clutch, driving and driven members, each carrying disks alternating with disks carried by the other member, one member having an outer laterally extending portion overhanging the other member, said other member having at its inner end a fixed clamping abutment and outwardly of the disks having a sliding clamping ring, the overhanging portion of the first named member and a portion of the second named member having a pair of opposing cylindrical surfaces between which said clamping ring is adapted to slide in an axial direction and which said ring engages.

7. In combination with a shaft, a stepped pulley on the shaft adapted to be clutched thereto or to rotate freely thereon, said pulley having one step thereon constituting an overhanging outer clutch member, an inner clutch member secured to the shaft within the outer clutch member, clutch disks between the inner and outer clutch members, a disk clamping ring movable axially to engage and disengage the clutch, said clamping ring having a bearing on a portion of the inner clutch member and also a bearing on a portion of the outer clutch member, and means for shifting said ring.

In testimony whereof, we hereunto affix our signatures.

GEORGE W. DRAKE.
LESLIE R. TUFTS.